June 4, 1963
A. J. PEARSON
3,092,529
DUCT OR CONDUIT BLANK
Filed July 1, 1955
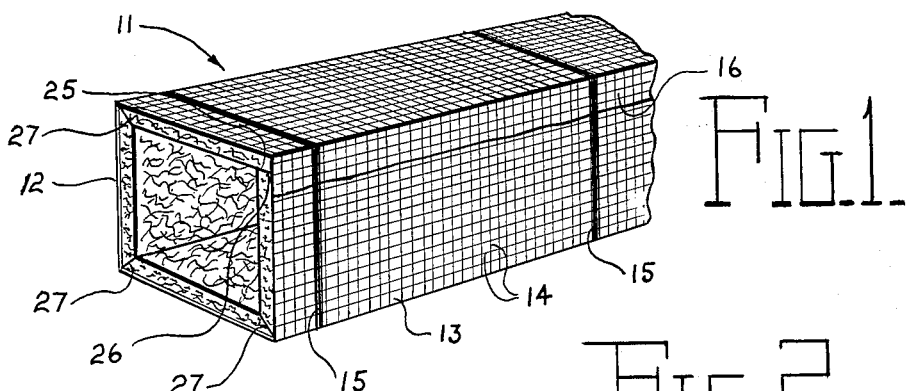
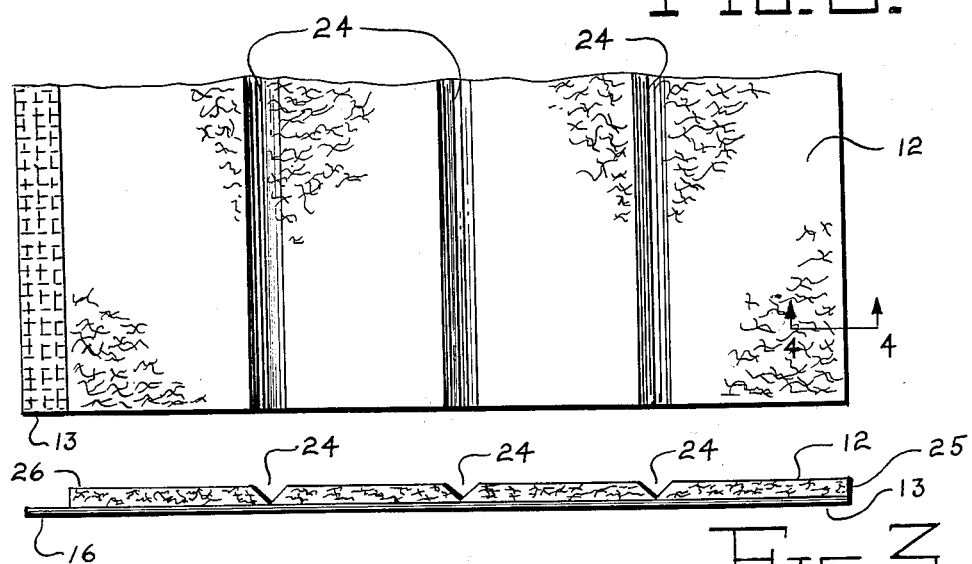
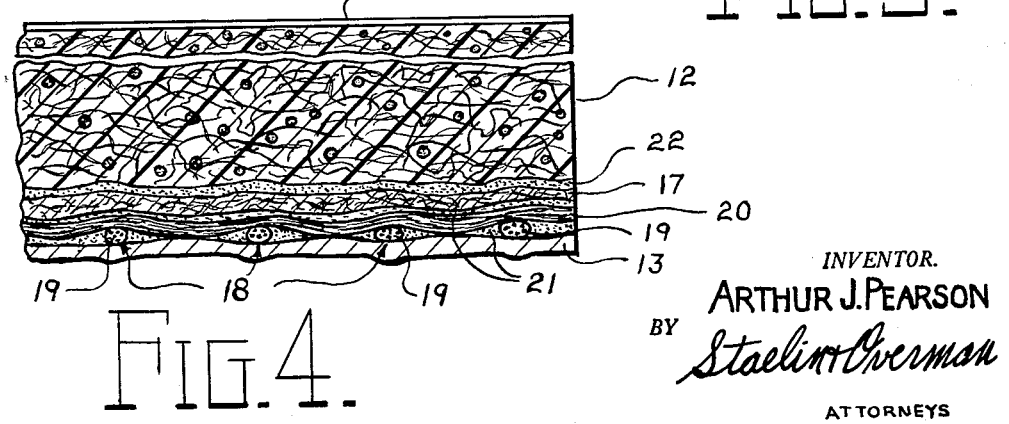
INVENTOR.
ARTHUR J. PEARSON
BY Staelin Overman
ATTORNEYS

United States Patent Office 3,092,529
Patented June 4, 1963

3,092,529
DUCT OR CONDUIT BLANK
Arthur J. Pearson, Kansas City, Mo., assignor to Owens-Corning Fiberglas Corporation, a corporation of Delaware
Filed July 1, 1955, Ser. No. 519,323
4 Claims. (Cl. 154—44)

This invention relates to a duct or conduit blank, and, more particularly, to a blank that is foldable into a duct or conduit or other similar structure, and is composed of a fibrous heat and acoustical insulating mass with a flexible sheet vapor barrier member adhered to one surface thereof.

Various fibrous masses have previously been suggested, and have been known to be excellent heat and acoustical insulating materials. The fibers in such masses can be mineral in nature, as glass, slag, or naturally occurring mineral fibers, such as asbestos, or they can be organic in nature, as natural fibers or synthetic fibers, and bound together into a mass by any suitable material such as a synthetic resin.

Various ducts or conduits have long been in general use for air-conditioning and other purposes, and have been fabricated from sheet metal, frequently with an exterior heat insulating coating, often of asbestos.

The instant invention is based upon the discovery that a duct or conduit, or similar structure, can be fabricated readily and inexpensively from a fibrous heat and acoustical insulating mass with a flexible vapor barrier facing member adhered to one surface thereof, and that unexpected advantages result from the fabrication of a duct or conduit in such manner.

It is, therefore, an object of the invention to provide an improved duct or conduit or similar structure.

It is a further object of the invention to provide a blank which is foldable to produce such duct or conduit or similar structure.

Other objects and advantages will be apparent from the description which follows, reference being had to the accompanying drawings, in which—

FIG. 1 is a perspective view of a duct according to the invention;

FIG. 2 is a plan view of a blank according to the invention foldable into the duct of FIG. 1;

FIG. 3 is a view in vertical elevation of the blank of FIG. 2; and

FIG. 4 is a view in vertical section along the line 4—4 of FIG. 2.

Referring now in more detail to the drawings, a conduit or duct according to the invention is indicated generally at 11 in FIG. 1. The specific conduit shown comprises a fibrous glass heat and acoustical insulating board 12 adhered to a metal foil facing member 13. Horizontal and vertical ridges 14 on the surface of the foil 13 indicate the position of a glass scrim reinforcing material in the conduit shown. Binding strips 15 hold the conduit in assembled position, in cooperation with a sealing strip 16.

The conduit 11 is formed by suitable folding of a blank, shown in detail in FIGS. 2, 3 and 4, and comprising the fibrous insulating board 12 adhered to the foil facing 13. Referring particularly to FIG. 4, in the specific blank, the foil 13 is reinforced by a layer 17 of kraft paper and glass scrim 18, which is composed of parallel glass strands 19 and parallel glass strands 20 disposed at right angles to the strands 19. The foil 13, kraft paper 17, and scrim 18 are formed into a sandwich structure and held in relative positions by any suitable adhesive 21, for example asphalt. The kraft paper layer 17 is adhered to the fibrous insulating board 12 by an adhesive layer 22, which can be asphalt or other suitable material.

A hardened coating composition 23 is adhered to the exposed surface of the insulating board 12. The composition 23 can be any suitable material, as its principal function is to prevent erosion of the fibrous board 12 when the conduit 11 is in service, and to minimize the resistance to the flow of either heated or cooled gasses therethrough. Excellent results have been achieved when the coating 23 has been a vinyl chloride-vinyl acetate copolymer, but any other coating composition that will harden, and will adhere to the particular insulating material employed can equally well be used.

Referring now more particularly to FIGS. 2 and 3, in the specific blank shown, three generally V-shaped cuts 24 are provided in the insulating board 12. Each of the cuts 24, in the preferred embodiment of the invention shown, extends only a portion of the way through the thickness of the board 12. The cuts 24 enable folding of the blank from the flattened condition shown in FIGS. 2 and 3 to define the conduit 11. When the blank is folded to form the conduit 11, a butt joint is formed between an end surface 25 thereof and a portion 26 of the upper surface thereof at the opposite end of the blank from the surface 25. The sealing strip 16, which, in the specific embodiment shown, is integral with the barrier 13 is then adhered to the portion thereof which it overlaps. The mating lines formed during folding as the edges of the V grooves 24 come into abutment are indicated at 27 in FIG. 1.

It will be apparent that various changes and modifications can be made from the specific details shown in the attached drawings and discussed in connection therewith. For example, while excellent results have been achieved using metal foil as the vapor barrier, other vapor barriers can be used in place of the metal foil, so long as the entire sandwich structure is sufficiently rigid and strong to have structural integrity and to be capable of handling and confining a stream of gases under a few inches of water pressure developed by blowers in ordinary air-conditioning or similar installations. For example, light gauge sheet metal can be employed, so long as the metal is not so stiff that special tools are required to form the conduit, or various plastic sheets or films can equally well be used. Polyethylene is particularly advantageous, because it is easily handled, is tough and flexible, and at the same time highly impervious to various gases. Numerous other synthetic resinous film and sheet materials can also be used, preferably in every case being sufficiently plasticized that they can be formed without the necessity for a heating step. The use of a metal vapor barrier is advantageous because the reflectivity thereof prevents losses in a cooling installation. It will be appreciated that vapor barrier sheet materials which are useful for producing blanks according to the invention must be sufficiently flexible that they can not be used alone to form a conduit, and that fibrous masses, alone, even in board form, which are so useful lack the structural integrity and strength necessary for such use. Blanks according to the invention, however, which are a combination of a vapor barrier and a fibrous mass, produce conduits that are wholly satisfactory.

Similarly, while glass scrim and kraft paper make excellent reinforcing materials, it is possible to use relatively stiffer vapor barriers and eliminate altogether the need for such reinforcement. Further, other reinforcing materials can be used in place of the kraft paper and glass scrim, including flexible synthetic resinous materials such as polyethylene, vinyl chloride-vinylidene chloride copolymers, and other materials, alone, or reinforced with glass or other fibers or fabrics.

The specific fibrous glass insulating board shown in the drawings is commercially available, and is produced by impregnating a mass of glass fibers with a phenol formaldehyde heat hardenable resinous material, and subjecting the resulting impregnated mass to heat and pressure to densify the mass and harden the resin. The resulting product is a comparatively rigid board, which is known for its excellent heat and acoustical insulating properties, and can be produced in any of many desired densities and rigidities. In general, rigidity, for such a material, is a direct function of density. In general, also, the higher the density and rigidity of the board employed in producing a blank or conduit according to the invention, the less is the need for reinforcing material such as kraft paper and glass scrim, as described. If desired, extremely low density material of this type can be employed, provided that sufficient rigidity is provided in the entire structure (either in the vapor barrier facing member or in a separate reinforcing layer) that the resulting blank or conduit is self-supporting, can be readily handled, and will withstand the pressures involved. Similarly, other fibrous heat and acoustical insulating masses can be used in place of the phenol formaldehyde-bonded fibrous glass board or mass described. For example, other mineral fibers can be used in place of the glass, including slag fibers, and naturally occurring mineral fibers such as asbestos, and naturally occurring organic fibers or synthetic resinous fibers suitably bonded to form a board or mass can also be used.

In its essential features, the invention contemplates a blank foldable into a duct or conduit, and comprising a fibrous heat and acoustical insulating mass adhered to one surface of a flexible sheet vapor barrier facing member, said mass having a plurality of cuts therein defining fold lines, and a conduit produced from such blank.

I claim:

1. A self-supporting air conditioning conduit consisting of a self-sustaining, fibrous heat and acoustical insulating board adhered to one surface of a flexible sheet vapor barrier facing member, said board having a plurality of generally V-shaped cuts extending partially through the thickness thereof, which cuts are substantially parallel to one another and to opposed edges of said board, the board being deformed adjacent said cuts to define the conduit, a sealing member adhered to edges of said facing member which are abutting in such deformed condition, and a hardened coating composition adhered to the surface of said board opposite said facing member, said coating being effective to minimize the resistance to the flow of gases therealong.

2. A self-supporting air conditioning conduit according to claim 1 and wherein: said flexible sheet vapor barrier facing member includes an outer facing, fibrous glass reinforcing, and an inner reinforcing sheet material all bound together and to said self-sustaining fibrous heat and acoustical insulating board by a binder.

3. A self-supporting air conditioning conduit according to claim 2 and wherein: said facing member is a metal foil, and said inner reinforcing sheet material is a kraft paper.

4. A self-supporting air-conditioning conduit consisting of a flexible, combined reinforcing and vapor barrier sandwich layer including a metal foil facing, fibrous glass and reinforcing sheet material, and a binder adhering said foil facing and said reinforcing sheet into a sandwich structure, and a self-sustaining mineral fiber heat and acoustical insulating board adhered to said sandwich structure with said vapor barrier sheet facing exposed, said board having a plurality of generally V-shaped cuts extending partially through the thickness thereof, which cuts are substantially parallel to one another and to opposed edges of said board, the board being deformed adjacent said cuts to define the conduit, a sealing member adhered to edges of said facing member which are abutting in such deformed condition, and a hardened coating composition adhered to the surface of said board opposite said sandwich structure, said coating being effective to minimize the resistance to the flow of gases therealong.

References Cited in the file of this patent

UNITED STATES PATENTS

| | | |
|---|---|---|
| 1,611,907 | Hall | Dec. 28, 1926 |
| 1,734,209 | Huffine | Nov. 5, 1929 |
| 2,172,048 | Johnson | Sept. 5, 1939 |
| 2,439,395 | Leatherman | Apr. 13, 1948 |
| 2,495,636 | Hoeltzel et al. | Jan. 24, 1950 |
| 2,550,465 | Gorski | Apr. 24, 1951 |
| 2,640,004 | Saun | May 26, 1953 |
| 2,642,370 | Parsons et al. | June 16, 1953 |
| 2,670,763 | Hiss | Mar. 2, 1954 |
| 2,726,977 | See et al. | Dec. 13, 1955 |

FOREIGN PATENTS

| | | |
|---|---|---|
| 420,615 | France | Feb. 3, 1911 |
| 482,809 | Great Britain | Apr. 5, 1938 |
| 617,067 | Great Britain | Feb. 1, 1949 |